United States Patent
Son et al.

(10) Patent No.: US 10,795,932 B2
(45) Date of Patent: Oct. 6, 2020

(54) METHOD AND APPARATUS FOR GENERATING TITLE AND KEYFRAME OF VIDEO

(71) Applicant: ELECTRONICS AND TELECOMMUNICATIONS RESEARCH INSTITUTE, Daejeon (KR)

(72) Inventors: Jeong Woo Son, Daejeon (KR); Sun Joong Kim, Sejong (KR); Won Joo Park, Daejeon (KR); Sang Yun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 34 days.

(21) Appl. No.: 16/122,621

(22) Filed: Sep. 5, 2018

(65) Prior Publication Data

US 2019/0095529 A1 Mar. 28, 2019

(30) Foreign Application Priority Data

Sep. 28, 2017 (KR) .......................... 10-2017-0126479
Feb. 8, 2018 (KR) .......................... 10-2018-0015825

(51) Int. Cl.
| | | |
|---|---|---|
| G06F 17/20 | (2006.01) | |
| G06F 16/738 | (2019.01) | |
| G06K 9/00 | (2006.01) | |
| G06F 16/487 | (2019.01) | |
| G06F 16/48 | (2019.01) | |
| G06F 16/41 | (2019.01) | |
| G06F 40/20 | (2020.01) | |
| G06F 40/216 | (2020.01) | |

(52) U.S. Cl.
CPC ............ *G06F 16/739* (2019.01); *G06F 16/41* (2019.01); *G06F 16/487* (2019.01); *G06F 16/489* (2019.01); *G06F 40/20* (2020.01); *G06F 40/216* (2020.01); *G06K 9/00744* (2013.01); *G06K 9/00751* (2013.01)

(58) Field of Classification Search
CPC .................................................... G06F 16/739
See application file for complete search history.

(56) References Cited

U.S. PATENT DOCUMENTS

| | | |
|---|---|---|
| 7,143,434 B1 | 11/2006 | Paek et al. |
| 7,181,757 B1 | 2/2007 | Kim et al. |
| 9,280,538 B2 | 3/2016 | Lee et al. |

(Continued)

FOREIGN PATENT DOCUMENTS

| | | |
|---|---|---|
| KR | 10-0436828 B1 | 6/2004 |
| KR | 10-1640317 B1 | 7/2016 |
| KR | 10-2017-0079283 A | 7/2017 |

*Primary Examiner* — Keith D Bloomquist

(57) ABSTRACT

Disclosed is a method and apparatus for generating a title and a keyframe of a video. According to an embodiment of the present disclosure, the method includes: selecting a main subtitle by analyzing subtitles of the video; selecting the keyframe corresponding to the main subtitle; extracting content information of the keyframe by analyzing the keyframe; generating the title of the video using metadata of the video, the main subtitle, and the content information of the keyframe; and outputting the title and the keyframe of the video.

10 Claims, 6 Drawing Sheets

(56) References Cited

U.S. PATENT DOCUMENTS

| | | | |
|---|---|---|---|
| 2009/0073314 A1* | 3/2009 | Uemukai | G11B 27/034 348/468 |
| 2009/0172543 A1* | 7/2009 | Cronin | G06F 3/04847 715/721 |
| 2015/0286718 A1* | 10/2015 | Wang | G06F 16/7844 707/738 |

* cited by examiner

| Subtitle | Start frame |
|---|---|
| Do you get up each morning too? | 37254 |

[Gangho Song and Haeil Park fight in tunnel... "Do you get up each morning too?]

METHOD AND APPARATUS FOR GENERATING TITLE AND KEYFRAME OF VIDEO

CROSS REFERENCE TO RELATED APPLICATION

The present application claims priority to Korean Patent Applications No. 10-2017-0126479, filed Sep. 28, 2017, and No. 10-2018-0015825, filed Feb. 8, 2018, the entire contents of which are incorporated herein for all purposes by this reference.

BACKGROUND OF THE INVENTION

Field of the Invention

The present disclosure relates generally to a method and apparatus for generating a title and a keyframe of a video. More particularly, the present disclosure relates to a method and apparatus for automatically generating a keyframe and a title of a video using a main subtitle of the video.

Description of the Related Art

As a content consumption environment has moved to the Internet, conventional consumption of unidirectional content which was received via a TV has changed to consumer's selective content consumption. In recent years, generally, content that is served in portals is provided to a user in a form of a particular content list and is selected therefrom by the user for watching. Here, the title of the content and a keyframe image intuitively provide a detail of the content to the user. Therefore, the tile of the content is required to implicitly express the detail of the content, and the keyframe image is also required to express the entire content in a single image. Titles and keyframes of a high quality induce consumers to select the content, and thus these are used as essential elements in most services.

Conventionally, regarding the title and the keyframe of the content, a person has directly made the title and has selected a particular frame among the all frames. However, since content providers have greatly increased in number and consumers have also increased in number due to activation of the Internet TV market, emergence of large-scale portals, and the like, there is a limit to manually input titles and keyframes of all contents, which causes a problem in that content to be exposed is limited.

Therefore, a technique of automatically generating the title appropriate for the video content, which is input, and the keyframe corresponding thereto is necessary.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a method of generating a title and a keyframe of a video using a main subtitle of the video.

It is to be understood that technical problems to be solved by the present disclosure are not limited to the aforementioned technical problems and other technical problems which are not mentioned will be apparent from the following description to a person with an ordinary skill in the art to which the present disclosure pertains.

In order to achieve the above object, according to one aspect of the present disclosure, there is provided a method of generating a title and a keyframe of a video, the method including: selecting a main subtitle by analyzing subtitles of the video; selecting the keyframe corresponding to the main subtitle; extracting content information of the keyframe by analyzing the keyframe; generating the title of the video using metadata of the video, the main subtitle, and the content information of the keyframe; and outputting the title and the keyframe of the video.

In the method of generating the title and the keyframe of the video, the selecting of the main subtitle by analyzing the subtitles of the video may include: performing a morphemic analysis on a per-morpheme basis on the subtitles of the video; calculating a weighting of a relation between words on the basis of a result of the morphemic analysis; calculating a relation-based word weighting on the basis of the weighting of the relation between words; calculating weightings for respective subtitles using the relation-based word weighting; and selecting the subtitle with a highest weighting as the main subtitle on the basis of the weightings for respective subtitles.

In the method of generating the title and the keyframe of the video, applying TextRank or kernel principal component analysis (kernel PCA) technique on the basis of information on the weighting of the relation between words.

In the method of generating the title and the keyframe of the video, at the selecting of the keyframe corresponding to the main subtitle, the keyframe may be selected by performing at least one of motion analyzing, person detection, resolution measurement, and background sound detection on the video of a particular segment corresponding to the main subtitle.

In the method of generating the title and the keyframe of the video, the selecting of the keyframe corresponding to the main subtitle may include reinforcing a frame by adjusting contrast and brightness of the selected keyframe.

In the method of generating the title and the keyframe of the video, the content information of the keyframe may include at least one piece of information on who, where, when, what, and how.

In the method of generating the title and the keyframe of the video, the metadata of the video may include at least one piece of information on an actor, a place, and an era of the video.

In the method of generating the title and the keyframe of the video, at the generating of the title of the video using the metadata of the video, the main subtitle, and the content information of the keyframe, the title of the video may be generated by combining the content information of the keyframe with information on the metadata of the video and by adding the main subtitle to the combined content information.

It is to be understood that the foregoing summarized features are exemplary aspects of the following detailed description of the present disclosure without limiting the scope of the present disclosure.

According to the present disclosure, it is possible that the subtitles of the video are analyzed and the keyframe and the title of the video are automatically generated.

Also, according to the present disclosure, it is possible that the cost is reduced by switching conventional manual generation to automatic generation and the time required for generation is also shortened.

Also, according to the present disclosure, it is possible that the title expressing content, a line, and main information all is generated by combining a subtitle, content, and a video analysis, and that the title effectively providing information of video content is generated.

Effects that may be obtained from the present disclosure will not be limited to only the above described effects. In addition, other effects which are not described herein will become apparent to those skilled in the art from the following description.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Figure 1:
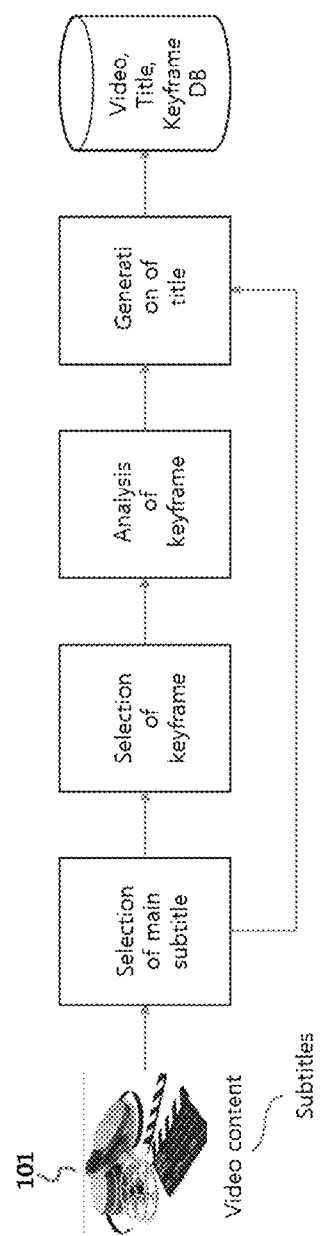
FIG. 1 is a diagram illustrating a method of automatically generating a title and a keyframe of a video according to an embodiment of the present disclosure.

Hereinbelow, exemplary embodiments of the present disclosure will be described in detail with reference to the accompanying drawings such that the disclosure can be easily embodied by those skilled in the art to which this disclosure belongs. However, the present disclosure may be embodied in various different forms and should not be limited to the embodiments set forth herein.

In the following description, if it is decided that the detailed description of known function or configuration related to the disclosure makes the subject matter of the disclosure unclear, the detailed description is omitted. Also, portions that are not related to the present disclosure are omitted in the drawings, and like reference numerals designate like elements.

In the present disclosure, when an element is "coupled to", "combined with", or "connected to" another element, it can be directly coupled to the other element or intervening elements may be present therebetween. Also, when a component "comprises" or "includes" an element, unless there is another opposite description thereto, the component does not exclude other elements but may further include the elements.

In the present disclosure, the tams "first", "second", etc. are only used to distinguish one element from another element. Unless specifically stated otherwise, the terms do not denote an order or importance. Thus, without departing from the scope of the present disclosure, a first element of an embodiment could be termed a second element of another embodiment. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components which are described in the various embodiments and additional other components is included in the scope of the present disclosure.

The present disclosure relates to a method and apparatus for generating a title and a keyframe of a video.

FIG. 1 is a diagram illustrating a method of automatically generating a title and a keyframe of a video according to an embodiment of the present disclosure.

Referring to FIG. 1, video content 101 which is input may be analyzed, and a main line may be selected.

Next, with respect to the selected main line, adjacent frames may be searched to select a keyframe, and content information may be generated using the selected keyframe with image processing technology.

By using the generated content information, the main subtitle, and metadata of the video, the title of the video may be generated, and the generated keyframe and the title of the video may be stored in a database for a keyframe.

Here, the video content 101 may include videos and subtitles of the videos. Broadcast content may include subtitles for the hearing-impaired. When there are no subtitles, subtitles of the video are generated using speech to text (STT) and optical character reader (OCR) techniques.

Hereinafter, each step of the method of generating the title and the keyframe of the video will be described in detail with reference to FIGS. 2 to 7.

Figures 2, 3:
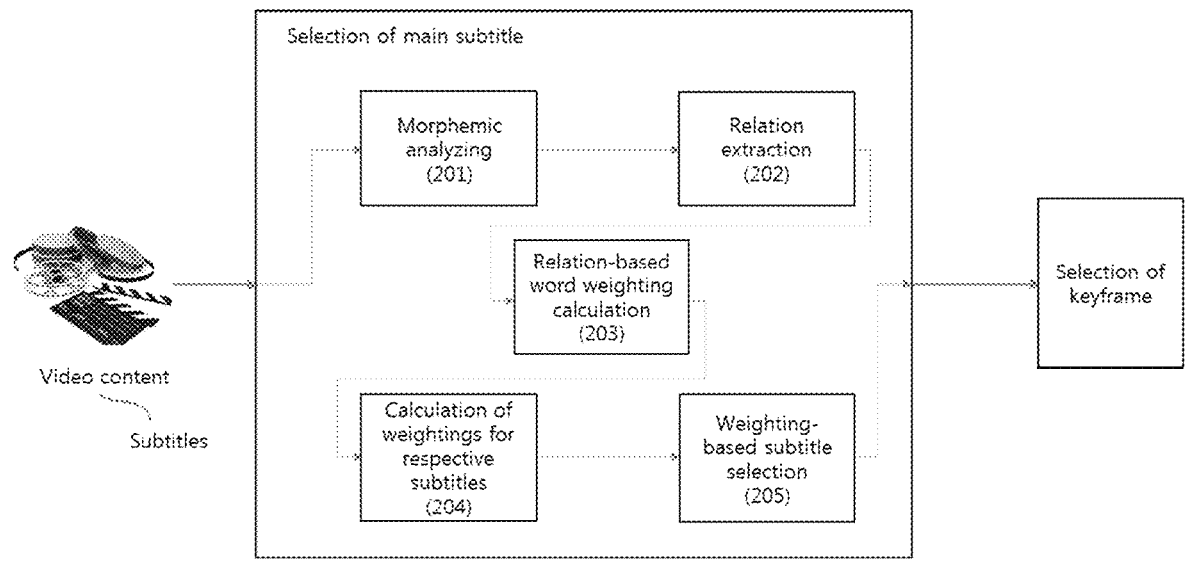
FIG. 2 is a diagram illustrating a method of selecting a main subtitle according to an embodiment of the present disclosure.
FIG. 3 is a diagram illustrating an example of main subtitle selection.

FIG. 2 is a diagram illustrating a method of selecting a main subtitle according to an embodiment of the present disclosure.

Referring to FIG. 2, morphemic analyzing 201 may mean performing a morphemic analysis on a per-morpheme basis on the subtitles of the video.

Relation extraction 202 may mean extracting the relation between key words on the basis of the result of the morphemic analysis. Specifically, on the basis of the result of the morphemic analysis, the structure of a sentence may be extracted through parsing, and on the basis of this, the relation between the key words and weightings thereof may be calculated. Here, the key words may be words having the meaning of the sentence, and may be a verb and an adjective;

and a noun, a pronoun, and a numeral. That is, it may mean selection of a noun, a verb, and an adjective.

For example, when a relation between a verb and a subject/object dependent thereon is obtained through parsing, the relation between a verb A and a noun B is obtained. When a parse tree T(S) of a sentence S is given, the distance between the verb A and the noun B corresponding to the end nodes is the shortest path length dT(A,B) from A to B in T(S). When assuming that the longest path which may be present in T(S) is M(T(S)), the weighting of the relation between A and b is (M(T(S))−dT(A,B))/M(T(S)). Further, on the basis of distance information in the sentence, the weighting of the relation between two words A and B may be calculated as 1.0−(d(A,B)/d(S)). The two types of weightings may be averaged to calculate the weighting of the relation between words.

Relation-based word weighting calculation 203 may mean applying TextRank, kernel principal component analysis (kernel PCA), and the like techniques using information on the weighting of the relation between words. Accordingly, among words configured in complex relations, the key word and the weighting of the key word may be calculated. The key point of the relation-based word weighting is that when a particular word A is associated with multiple words and the weightings of the associated words are high, a high weighting is assigned to the particular word A.

When the weightings of the words are calculated, calculation 204 of weightings for respective subtitles is performed on the basis of the weightings of the words. The calculation of the weightings for respective subtitles is calculated as "a×W(S)+(1-a)×e(L(S))" based on a weighting average W(S) of the words that make up the subtitle and the length L(S) of the subtitle. Here, a is a value between zero and one and is a user parameter that determines which one of the weighting average and the length is considered as important. e(L(S)) is an exponential function that normalizes and returns the length of the sentence.

For example, a Gaussian function is configured on the basis of the average length of all subtitles and the distribution of the lengths, and how long the given subtitle is longer than the average is represented by a value between zero and one.

When the calculation of the weightings for respective subtitles is completed, selection 205 of the subtitle with the highest weighting is performed. The selected subtitle may be configured as data shown in FIG. 3, and may be used in selecting the keyframe. Here, based on the start frame of the subtitle, a particular segment of the video may be transmitted.

Figure 4:
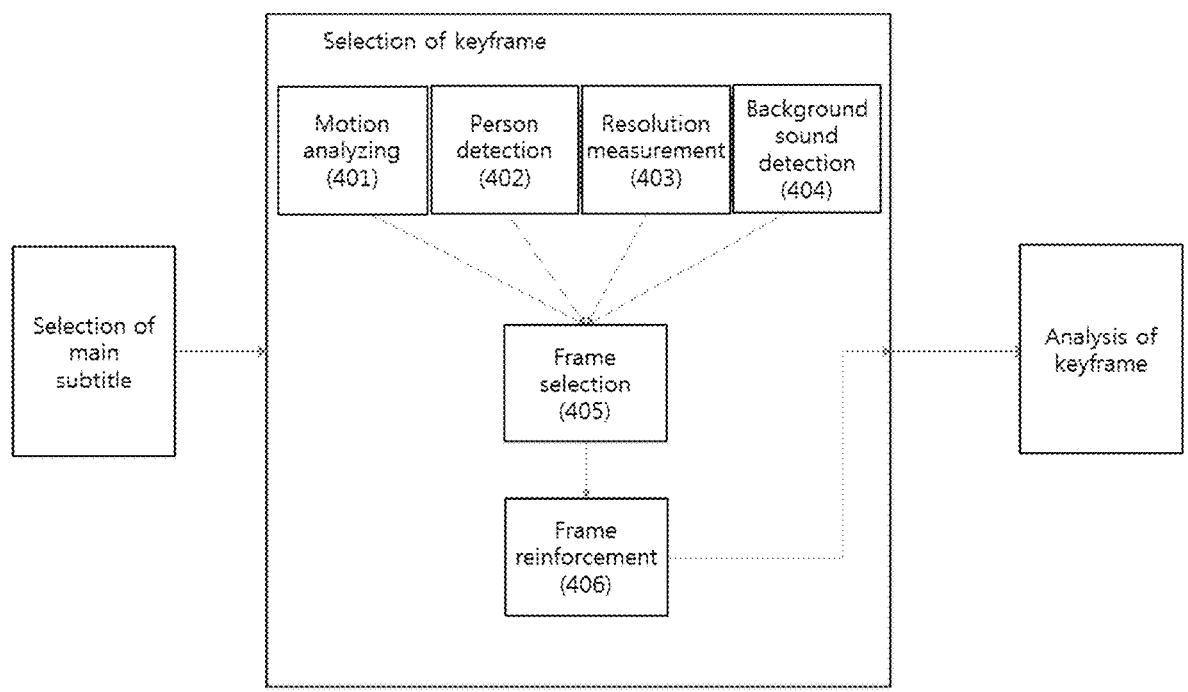
FIG. 4 is a diagram illustrating a method of selecting a keyframe according to an embodiment of the present disclosure.

FIG. 4 is a diagram illustrating a method of selecting a keyframe according to an embodiment of the present disclosure.

Referring to FIG. 4, at least one of motion analyzing 401, person detection 402, resolution measurement 403, and background sound detection 404 is performed on the video of the particular segment corresponding to the main subtitle such that it is analyzed with respect to each frame of the video whether a characteristic motion is present, a person is present, the video is clear, background music is played, there is a conversation, and the like.

Frame selection 405 may mean selecting the optimum frame on the basis of the result of the analysis according to a predefined pattern such as a frame in which movement (motion) is little, a frame in which a person is present, a clear frame, a frame in which background music is played, and the like.

Frame reinforcement 406 may mean performing post-processing to enhance legibility of the image, such as contrast, brightness, and the like with respect to the selected frame. Here, the image of the selected frame may be defined as the keyframe.

In the meantime, the keyframe and the video of the particular segment to which the keyframe belongs may be used for a keyframe analysis.

The keyframe analysis may mean generating content information (for example, the sentence) describing the selected keyframe as shown in FIG. 4 and the particular segment of the sampled video with the keyframe in the center, on the basis thereof.

Specifically, an image captioning or video captioning technique may be used to extract content information corresponding to "who", "where", "when", "what", "how", and the like.

Figure 5:
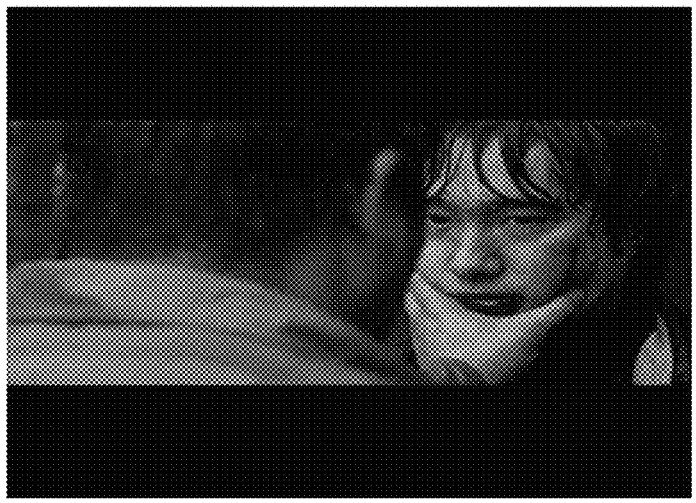
FIG. 5 is a diagram illustrating a method of analyzing a keyframe according to an embodiment of the present disclosure.

For example, when assuming that the image shown in FIG. 5 is a keyframe, the keyframe and the video segment with the keyframe in the center are analyzed such that the content information such as "two men", "in the tunnel", "struggle/conversation", and "in the rain" is extracted.

Figure 6:
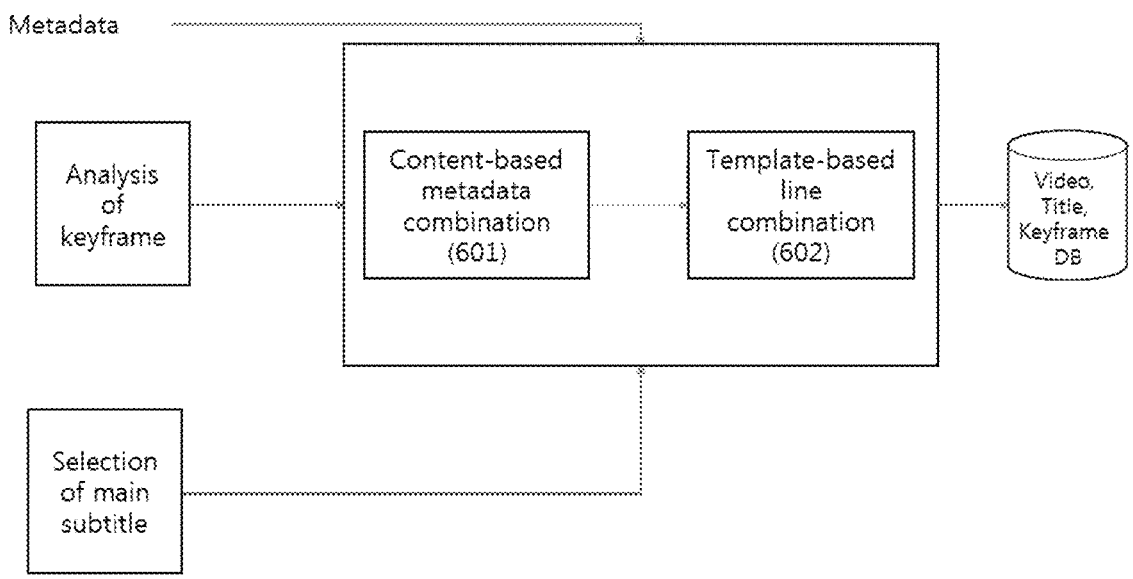
FIG. 6 is a diagram illustrating a method of generating a title of a video according to an embodiment of the present disclosure.

FIG. 6 is a diagram illustrating a method of generating a title of a video according to an embodiment of the present disclosure.

According to the present disclosure, the title of the video may be generated on the basis of the content information obtained as the result of the keyframe analysis, the selected main subtitle, and the metadata of the video. Here, the metadata of the video may include information on the actor in the video, the background (the place, the era, etc.), and the like.

Referring to FIG. 6, content-based metadata combination 601 may mean the process of connecting particular information included in the content information to the corresponding metadata for elaboration.

For example, when the content information is "two men", "in the tunnel", "struggle/conversation", and "in the rain", these are changed into "Gangho Song and Haeil Park", "in the tunnel", and "struggle/conversation" by applying information on the actors (Gangho Song and Haeil Park) included in the metadata. In addition, the shooting location, the background music title, and the like may be added.

Template-based line combination 602 is a step of generating a sentence by combining the changed content information with the main subtitle. The combination of the main subtitle and the content information may be configured on the basis of a predefined template.

For example, first, a sentence "Gangho Song and Haeil Park fight in the tunnel . . . " may be generated on the basis of the content information. Next, by combining the generated sentence with the main subtitle, the title of the video [Gangho Song and Haeil Park fight in the tunnel . . . "Do you get up each morning too?"] may be generated.

Figure 7:
FIG. 7 is a diagram illustrating an example of display a title and a keyframe of a video.

Also, the generated title of the video may be output with the keyframe as shown in FIG. 7. Alternatively, the generated title of the video may b stored in the database with the keyframe.

Figure 8:
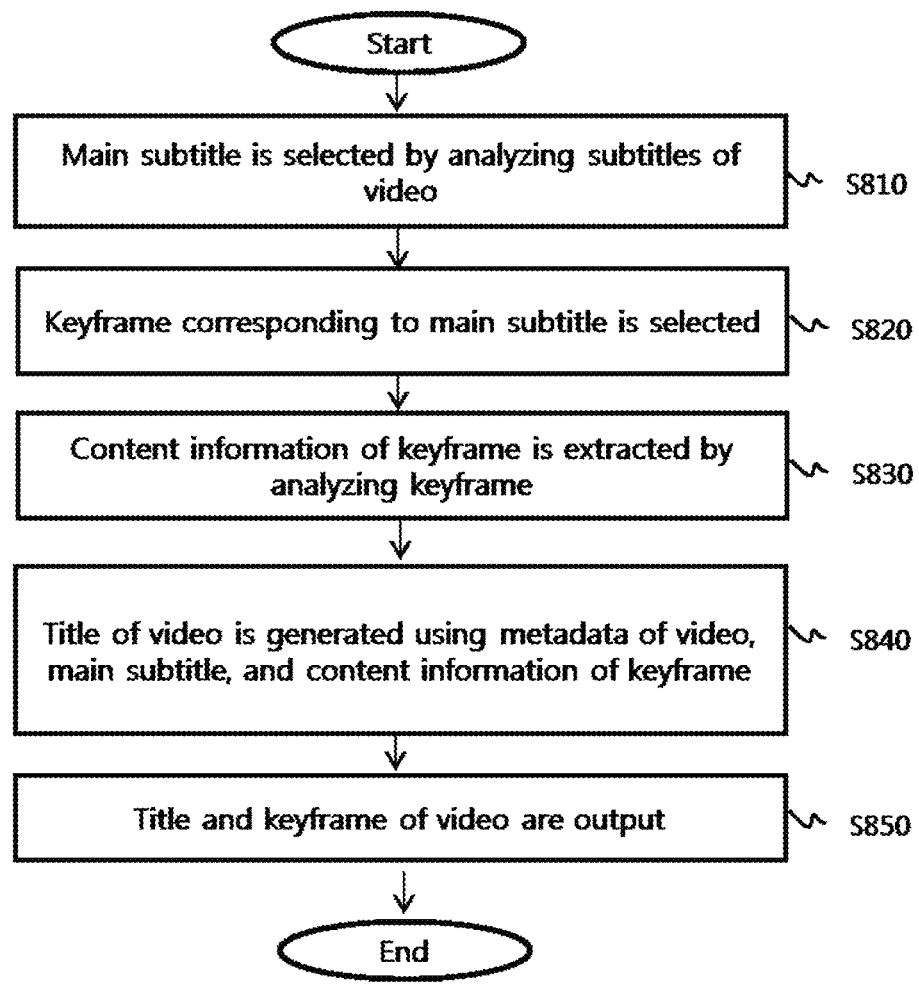
FIG. 8 is a flowchart illustrating a method of generating a title and a keyframe of a video according to an embodiment of the present disclosure.

FIG. 8 is a flowchart illustrating a method of generating the title and the keyframe of the video according to an embodiment of the present disclosure.

Referring to FIG. 8, the main subtitle may be selected by analyzing the subtitles of the video at step S810. Here, the main subtitle may be a subtitle with the highest weighting among the subtitles of the video.

Next, the keyframe corresponding to the selected main subtitle may be selected at step S820. Specifically, using at least one of motion analyzing, person detection, resolution measurement, and background sound detection, the keyframe may be selected from the video of the particular segment corresponding to the selected main subtitle.

Next, the content information of the keyframe may be extracted by analyzing the keyframe at step S830. Here, the content information of the keyframe may include information on at least one of "who", "where", "when", "what", and "how".

Next, the title of the video may be generated using the metadata of the video, the main subtitle, and the content information of the keyframe at step S840. Specifically, the content information of the keyframe is combined with information on the metadata of the video, and the main subtitle is added to the combined content information, whereby the title of the video is generated.

Next, the generated title and keyframe of the video may be output at step S850.

Figure 9:
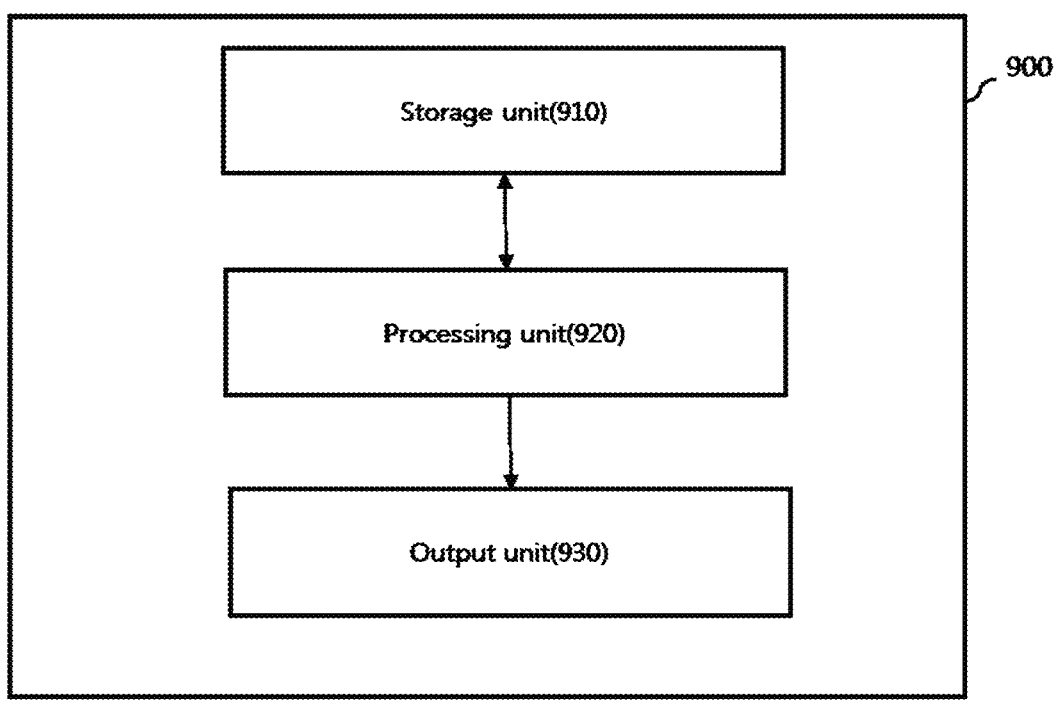
FIG. 9 is a block diagram illustrating an apparatus for generating a title and a keyframe of a video according to an embodiment of the present disclosure.

FIG. 9 is a block diagram illustrating an apparatus for generating a title and a keyframe of a video according to an embodiment of the present disclosure.

Referring to FIG. 9, the apparatus 900 for generating the title and the keyframe of the video may include a storage unit 910, a processing unit 920, and an output unit 930.

The storage unit 910 may store the videos, the subtitles of the video, and the metadata of the video.

Further, the storage unit 910 may store the title and the keyframe of the video generated by the processing unit 920.

In the meantime, the storage unit 910 may further store an application, data, and instructions for operations run on the apparatus 900 for generating the title and the keyframe of the video.

The processing unit 920 may generate the title and the keyframe of the video using the videos, the subtitles of the video, and the metadata of the video stored in the storage unit 910. Since the generation of the title and the keyframe of the video have been described in detail with reference to FIG. 8, the description will be omitted.

Also, the processing unit 920 may transmit the title and the keyframe of the video to the storage unit 910 or to the output unit 930.

In the meantime, in addition to the operation of generating the title and the keyframe of the video, the processing unit 920 is typically capable of controlling the overall operation of a mobile terminal.

The output unit 930 may output the title and the keyframe of the video received from the processing unit 920.

Although exemplary methods of the present disclosure are represented as a series of operations for clarity of description, the order of the steps is not limited thereto. When necessary, the illustrated steps may be performed simultaneously or in a different order. In order to realize the method according to the present disclosure, other steps may be added to the illustrative steps, some steps may be excluded from the illustrative steps, or some steps may be excluded while additional steps may be included.

The various embodiments of the present disclosure are not intended to list all possible combinations, but to illustrate representative aspects of the present disclosure. The matters described in the various embodiments may be applied independently or in a combination of two or more.

Also, the various embodiments of the present disclosure may be implemented by hardware, firmware, software, or a combination thereof. With hardware implementation, the embodiment may be implemented by using at least one selected from a group of application specific integrated circuits (ASICs), digital signal processors (DSPs), digital signal processing devices (DSPDs), programmable logic devices (PLDs), field programmable gate arrays (FPGAs), general-purpose processors, controllers, micro controllers, micro processors, etc.

The scope of the present disclosure includes software or machine-executable instructions (e.g., an operating system, an application, firmware, a program, etc.) that cause operation according to the methods of the various embodiments to be performed on a device or a computer, and includes a non-transitory computer-readable medium storing such software or instructions to be executed on a device or a computer.

What is claimed is:

1. A method of generating a title and a keyframe of a video, the method comprising:
   selecting a main subtitle by analyzing subtitles of the video;
   selecting the keyframe corresponding to the main subtitle;
   extracting content information of the keyframe by analyzing the keyframe;
   generating the title of the video using metadata of the video, the main subtitle, and the content information of the keyframe; and
   outputting the title and the keyframe of the video,
   wherein the main subtitle comprises at least one word of subtitles that includes a morphemic unit having a meaning in at least one sentence, and
   wherein the selecting of the main subtitle by analyzing the subtitles of the video comprises:
   calculating a first weight of a relation between words; and
   calculating a second weight for the subtitles.

2. The method of claim 1, wherein the selecting of the main subtitle by analyzing the subtitles of the video comprises:
   performing a morphemic analysis on a per-morpheme basis on the subtitles of the video;
   calculating the first weight of the relation between words on the basis of a result of the morphemic analysis;
   calculating a relation-based word weighting on the basis of the first weight;
   calculating the second weight for respective subtitles using the relation-based word weighting; and
   selecting the subtitle with a highest weighting as the main subtitle on the basis of the second weight.

3. The method of claim 2, wherein the relation-based word weighting is calculated by applying TextRank or kernel principal component analysis (kernel PCA) technique on the basis of information on the first weight.

4. The method of claim 1, wherein at the selecting of the keyframe corresponding to the main subtitle, the keyframe is selected by performing at least one of motion analyzing, person detection, resolution measurement, and background sound detection on the video of a particular segment corresponding to the main subtitle.

5. The method of claim 4, wherein the selecting of the keyframe corresponding to the main subtitle comprises:
   reinforcing a frame by adjusting contrast and brightness of the selected keyframe.

6. The method of claim 1, wherein the content information of the keyframe comprises at least one piece of information on who, where, when, what, and how.

7. The method of claim 1, wherein the metadata of the video comprises at least one piece of information on an actor, a place, and an era of the video.

8. The method of claim 1, wherein at the generating of the title of the video using the metadata of the video, the main subtitle, and the content information of the keyframe, the title of the video is generated by combining the content information of the keyframe with information on the metadata of the video and by adding the main subtitle to the combined content information.

9. The method of claim 1, wherein calculating the first weight comprises:
   determining a relation between a first word A and a second word B in the morphemic unit;
   determining a distance d(A, B) between the first word A and the second word B;
   determining the shortest path length dT(A, B) from the first word A and the second word B in a parse tree T(S) of a sentence S, and the longest path M(T(S)) in the parse tree T(S); and
   calculating a formula 1 as follows:

$$(M(T(S))-dT(A,B))/M(T(S)) \qquad \text{[Formula 1]}.$$

10. The method of claim 9, wherein calculating the first weight further comprises:
    calculating a formula 2 as follows:

$$1.0(d(A,B)/d(S)); \text{and} \qquad \text{[Formula 2]}$$

calculating, as the first weight, an average of results of the formula 1 and the formula 2.

* * * * *